(12) United States Patent
Cudak et al.

(10) Patent No.: US 9,116,604 B2
(45) Date of Patent: *Aug. 25, 2015

(54) MULTI-DEVICE VISUAL CORRELATION INTERACTION

(71) Applicant: INTERNATIONAL BUSINESS MACHINES CORP, Armonk, NY (US)

(72) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 144 days.

This patent is subject to a terminal disclaimer.

(21) Appl. No.: 13/660,042

(22) Filed: Oct. 25, 2012

(65) Prior Publication Data

US 2014/0123026 A1    May 1, 2014

(51) Int. Cl.
| | |
|---|---|
| G06F 3/00 | (2006.01) |
| G06F 3/0484 | (2013.01) |
| G06F 3/14 | (2006.01) |
| G06F 9/44 | (2006.01) |
| G06F 3/0481 | (2013.01) |

(52) U.S. Cl.
CPC ............ *G06F 3/0484* (2013.01); *G06F 3/0481* (2013.01); *G06F 3/1423* (2013.01); *G06F 9/4443* (2013.01); *G06F 9/4445* (2013.01)

(58) Field of Classification Search
None
See application file for complete search history.

(56) References Cited

U.S. PATENT DOCUMENTS

| | | |
|---|---|---|
| 6,091,395 A | 7/2000 | DeStefano |
| 6,717,600 B2 | 4/2004 | Dutta et al. |
| 6,779,023 B2 | 8/2004 | Tognazzini |
| 7,505,029 B2 | 3/2009 | MacPherson |
| 7,574,691 B2 | 8/2009 | Freitas et al. |
| 7,643,012 B2 | 1/2010 | Kim et al. |
| 7,676,549 B2 * | 3/2010 | McKeon et al. .............. 709/217 |
| 7,770,120 B2 | 8/2010 | Baudisch |
| 7,861,187 B2 | 12/2010 | Diederiks et al. |
| 8,064,830 B2 | 11/2011 | Lai |
| 2005/0223343 A1 | 10/2005 | Travis et al. |
| 2005/0229119 A1 | 10/2005 | Torvinen |
| 2006/0038833 A1 * | 2/2006 | Mallinson et al. ............ 345/633 |
| 2006/0150109 A1 * | 7/2006 | Schultz et al. ................ 715/759 |

(Continued)

*Primary Examiner* — Matt Kim
*Assistant Examiner* — Mahelet Shiberou
(74) *Attorney, Agent, or Firm* — Edward J. Lenart; Katherine S. Brown; Kennedy Lenart Spraggins LLP

(57) ABSTRACT

Multi-device visual correlation interaction includes displaying, by a first device, a user interface representation of a user interface displayed by a second device, the user interface representation containing one or more element representations, each element representation corresponding to an element contained within the user interface displayed by the second device; receiving from a user of the first device, a selection of a particular element representation of the user interface representation, the particular element representation corresponding to a particular element contained within the user interface; transmitting to the second device, by the first device, a contextual information request corresponding to the selection; in response to transmitting the contextual information request, receiving from the second device, by the first device, contextual information corresponding to the selection; and generating based on the contextual information, by the first device, a contextual list of actions associated with the particular element.

10 Claims, 7 Drawing Sheets

(56) References Cited

U.S. PATENT DOCUMENTS

| | | |
|---|---|---|
| 2009/0006958 A1 | 1/2009 | Pohjola et al. |
| 2010/0315418 A1* | 12/2010 | Woo .............................. 345/419 |
| 2011/0113345 A1 | 5/2011 | Choi |
| 2011/0138317 A1* | 6/2011 | Kang et al. .................... 715/780 |
| 2011/0138416 A1* | 6/2011 | Kang et al. ...................... 725/39 |
| 2012/0005587 A1 | 1/2012 | Martin et al. |
| 2013/0191781 A1* | 7/2013 | Radakovitz et al. .......... 715/810 |
| 2013/0290857 A1* | 10/2013 | Beveridge .................... 715/740 |

* cited by examiner

MULTI-DEVICE VISUAL CORRELATION INTERACTION

BACKGROUND OF THE INVENTION

1. Field of the Invention

The field of the invention is data processing, or, more specifically, methods, apparatuses, and computer program products for multi-device visual correlation interaction.

2. Description of Related Art

A mobile device is a small computing device, typically used by a user for performing data processing tasks and interacting with communication networks. Examples of such mobile electronic devices may include cell phones, smartphones, personal digital assistants (PDAs), portable computing devices, portable email devices, and hand-held games. As the complexity and types of tasks performed by the mobile devices increases, the importance of the capability of the mobile devices to communicate with each other also increases.

SUMMARY OF THE INVENTION

Methods, apparatuses, and computer program products for multi-device visual correlation interaction are provided. In a particular embodiment, multi-device visual correction interaction includes displaying, by a first device, a user interface representation of a user interface displayed by a second device, the user interface representation containing one or more element representations, each element representation corresponding to an element contained within the user interface displayed by the second device; receiving from a user of the first device, a selection of a particular element representation of the user interface representation, the particular element representation corresponding to a particular element contained within the user interface; transmitting to the second device, by the first device, a contextual information request corresponding to the selection; in response to transmitting the contextual information request, receiving from the second device, by the first device, contextual information corresponding to the selection; and generating based on the contextual information, by the first device, a contextual list of actions associated with the particular element.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
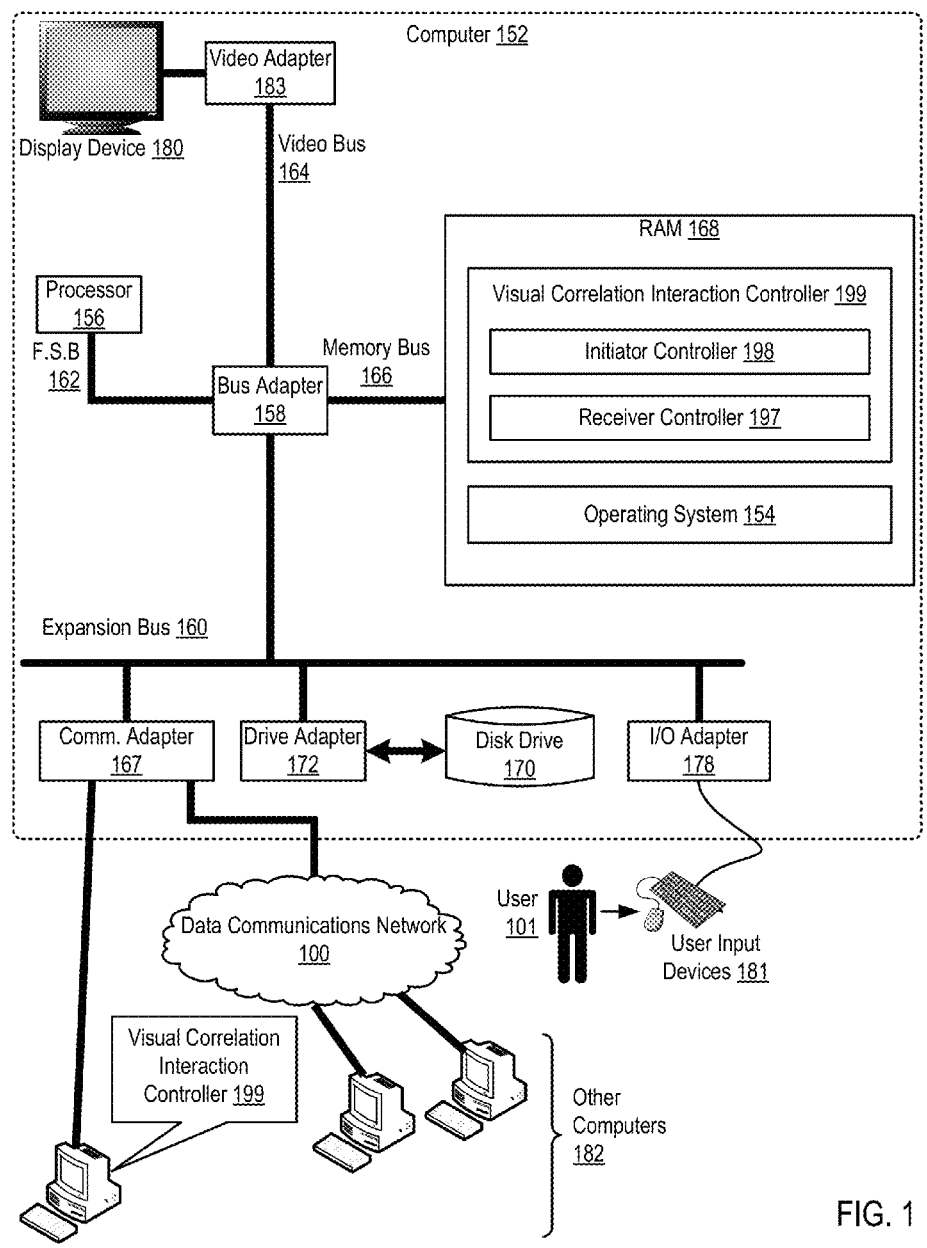
FIG. 1 sets forth a block diagram of automated computing machinery comprising an exemplary computer useful in multi-device visual correlation interaction according to embodiments of the present invention.

Exemplary methods, apparatuses, and computer program products for multi-device visual correlation interaction in accordance with the present invention are described with reference to the accompanying drawings, beginning with FIG. 1. Multi-device visual correlation interaction in accordance with the present invention is generally implemented with computers, that is, with automated computing machinery. FIG. 1 sets forth a block diagram of automated computing machinery comprising an exemplary computer (152) useful in multi-device visual correlation interaction according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a visual correlation interaction controller (199) that includes computer program instructions for multi-device visual correlation interaction. In the example of FIG. 1, the visual correlation interaction controller (199) includes an initiator controller (198) and a receiver controller (197). Although the visual correlation interaction controller (199) of FIG. 1 includes both the initiator controller (198) and the receiver controller (197), according to embodiments of the present invention, a device may include a visual correlation interaction controller that includes only one of an initiator controller and a receiver controller.

The initiator controller (198) includes computer program instructions that when executed by the computer processor (156) cause the computer (152) to carry out the step of displaying a user interface representation of a user interface displayed by a second device, such as one of the other computers (182) in FIG. 1. A user interface is an environment providing interaction between a user of a device and the software and hardware of the device. An element is an actionable object contained with the user interface. Examples of user interfaces may include but are not limited to desktops and windows of operating systems, as well as other environments capable of containing elements. Examples of elements may include but are not limited to data files, such as text files, images, and video clips. Elements may also include executable files or links to executable files, such as applications and games. A user interface representation is a copy of an image of a user interface displayed on another device and may include element representations. An element representation is a copy of an element contained within the user interface displayed on the other device. That is, when the computer (152) is performing multi-device visual correlation interaction by using the initiator controller (198), the computer (152) may display a copy of the screen displayed by another computer.

The initiator controller (198) also includes computer program instructions that when executed by the computer processor (156) cause the computer (152) to carry out the steps of receiving from a user (101) of the computer (152), a selection of a particular element representation of the user interface representation and transmitting to the other computer, a contextual information request corresponding to the selection. A contextual information request is a request for contextual information associated with an element represented by the selected element representation. Contextual information is information associated with the actionable properties of the element. For example, if a user selects an element representation of a text file, contextual information associated with that element may indicate the types of actions capable of being performed on a text file, such as copying from one or more sources, getting information about the text file, and requesting transfer of the file from a source.

The initiator controller (198) also includes computer program instructions that when executed by the computer processor (156) cause the computer (152) to carry out the step of in response to transmitting the contextual information request, receiving from the other device, contextual information corresponding to the selection. The initiator controller (198) also includes computer program instructions that when executed by the computer processor (156) cause the computer (152) to carry out the step of generating based on the contextual information, a contextual list of actions associated with the particular element. A contextual list of actions is a list of actions capable of being performed.

For example, if the selected element representation corresponds to an element that is a movie that is being displayed on the other device, the contextual list of actions may include but are not limited to adding the movie to an online movie queue, getting information about the movie, purchasing the movie, and copying the movie from a source, such as the other device, to the computer (152). As another example, if the selected element representation corresponds to an element that is a file on the home screen of the other device, the contextual list of actions may include but are not limited to copying the file from the other device to the computer (152), getting information about the file, and searching for the file on the internet. As another example, if the selected element representation corresponds to an element that is an application link or executable, such as an online game, on the screen of the other device, the contextual list of actions may include but are not limited to downloading the application from an online store, initiating the application, and getting information about the application. As another example, if the selected element representation corresponds to an element that is a contact file, the list of contextual actions may include but are not limited to updating the computer (152) with the contact information included in the contact file and adding the contact file to a contact library of the computer (152). Readers of skill in the art will realize multi-device visual correlation interaction according to embodiments of the present invention is possible using different types of elements and actions not listed here.

When the computer (152) is acting as the receiving device instead of the initiator device, the computer (152) may use the receiver controller (197). The receiver controller (197) includes computer program instructions that when executed by the computer processor (156) cause the computer (152) to carry out the step of transmitting to another device, such as one of the other computers (182), representative information specifying a user interface displayed by the computer (152). Representative information is information associated with the rendering of an image of the user interface displayed by the computer (152). An initiator controller executing on another device may use the received representative information to generate and display a user interface representation.

The receiver controller (197) includes computer program instructions that when executed by the computer processor (156) cause the computer (152) to carry out the step of receiving from the other device, a contextual information request indicating an element contained within the user interface displayed by the computer (152). As explained above, a contextual information request is a request for contextual information associated with an element represented by the selected element representation.

The receiver controller (197) also includes computer program instructions that when executed by the computer processor (156) cause the computer (152) to carry out the steps of: generating contextual information corresponding the element indicated in the contextual information request and transmitting to the first device, the contextual information corresponding to the element contained within the user interface.

By using a selection of an element representation displayed on one device to generate contextual information and a contextual list of actions associated with an element of a user interface of another device, the complexity of visual representing and interacting with elements on multi-devices is reduced.

Also stored in RAM (168) is an operating system (154). Operating systems useful multi-device visual correlation interaction according to embodiments of the present invention include UNIX™, Linux™, Microsoft XP™, AIX™, IBM's i5/OS™, and others as will occur to those of skill in the art. The operating system (154), the visual correlation interaction controller (199), the initiator controller (198), the receiver controller (197) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for multi-device visual correlation interaction according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. User input may also be received through interaction with a touch screen display. The example computer (152) of FIG. 1 includes a video adapter (183), which is an example of an I/O adapter specially designed for graphic output to a display device (180) such as a display screen, touch screen display, or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for multi-device visual correlation interaction according to embodiments of the present invention include modems for wired dial-up communications, Ethernet (IEEE 802.3) adapters for wired data communications network communications, and 802.11 adapters for wireless data communications network communications.

Figure 2:
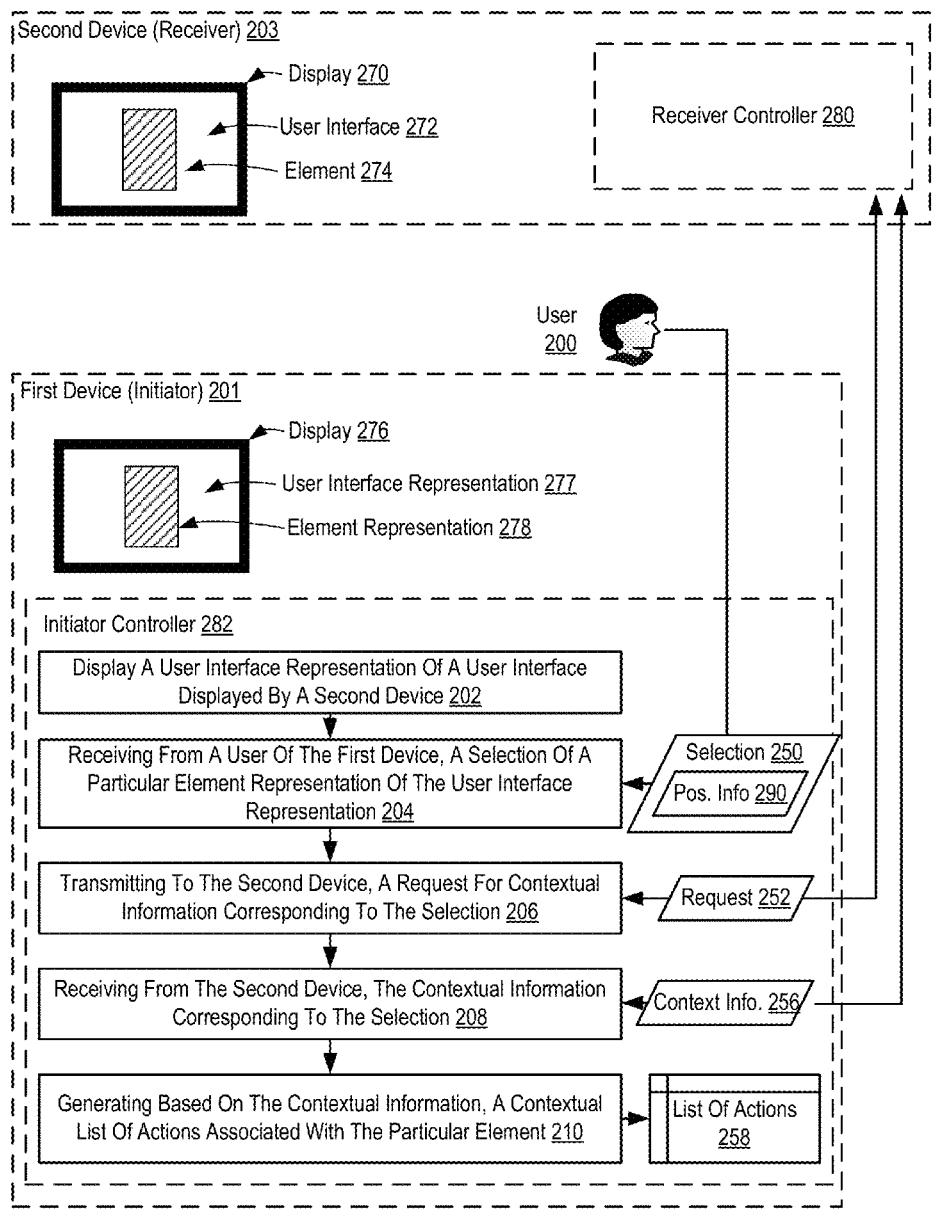
FIG. 2 sets forth a flow chart illustrating an exemplary method for multi-device visual correlation interaction according to embodiments of the present invention.

For further explanation, FIG. 2 sets forth a flow chart illustrating an exemplary method for multi-device visual correlation interaction according to embodiments of the present invention. The method of FIG. 2 includes displaying (202), by a first device (201), a user interface representation (277) of a user interface (272) displayed by a second device (203). In the example of FIG. 2, the user interface representation (277) contains an element representation (278) corresponding to an element (274) contained within the user interface (272) displayed by the second device (203). A user interface is an environment providing interaction between a user of a device and the software and hardware of the device. An element is an actionable object contained with the user interface. Examples of user interfaces may include but are not limited to desktops and windows of operating systems, as well as other environments capable of containing elements. Examples of elements may include but are not limited to data files, such as text files, images, and video clips. Elements may also include executable files, such as applications. A user interface representation is a copy of an image of a user interface displayed on another device and may include element representations. An element representation is a copy of an element contained within the user interface displayed on the other device. The first device may generate a user interface representation based on representative information received from the second device via a communication link. The first device may also generate a user interface representation using a camera interface of the first device. For example, a user may via the user interface of the second device by capturing images through the camera of the first device. That is, the first device generates a user interface representation of the second device based on images captured by the camera of the first device. Displaying (202), by a first device (201), a user interface representation (277) of a user interface (272) displayed by a second device (203) may be carried out by display a copy of the screen displayed by the second device (203).

The method of FIG. 2 also includes receiving (204) from a user (200) of the first device (201), a selection (250) of a particular element representation (278) of the user interface representation (277). In the example of FIG. 2, the particular element representation (277) corresponds to a particular element (274) contained within the user interface (272). A selection may include positional information of the particular element representation within the user interface representation. Receiving (204) from a user (200) of the first device (201), a selection (250) of a particular element representation (278) of the user interface representation (277) may be carried out by receiving user touch screen input indicating a particular position on a touch screen of the first device (201); receiving user input from a keyboard or audio input device, such as a microphone, and correlating the particular position with an element of the user interface.

The method of FIG. 2 includes transmitting (206) to the second device (203), by the first device (201), a contextual information request (252) corresponding to the selection (250). A contextual information request is a request for contextual information associated with an element represented by the selected element representation. Contextual information is information associated with the actionable properties of the element. For example, if a user selects an element representation of a text file, contextual information may indicate the types of actions capable of being performed on a text file, such as copying from one or more sources. Transmitting (206) to the second device (203), by the first device (201), a contextual information request (252) corresponding to the selection (250) may be carried out by indirect or direction communication between the first device (201) and the second device (203). For example, the first device (201) may transmit the contextual information request using a wireless connection or a physical wired connection.

The method of FIG. 2 also includes in response to transmitting the contextual information request (252), receiving (208) from the second device (203), by the first device (201), contextual information (256) corresponding to the selection (250). Receiving (208) from the second device (203), by the first device (201), contextual information (256) corresponding to the selection (250) may be carried out by receiving one or more messages containing data indicating the contextual information.

The method of FIG. 2 includes generating (210) based on the contextual information (256), by the first device (201), a contextual list of actions (260) associated with the particular element (274). A contextual list of actions is a list of actions capable of being performed. Generating (210) based on the contextual information (256), by the first device (201), a contextual list of actions (260) associated with the particular element (274) may be carried out by examining the received contextual information, identifying one or more actions, and creating a list that includes the identified one or more actions.

For example, if the selected element representation corresponds to an element that is a movie that is being displayed on the other device, the contextual list of actions may include but are not limited to adding the movie to an online movie queue, getting information about the movie, purchasing the movie, and copying the movie from a source, such as the other device, to the computer (152). As another example, if the selected element representation corresponds to an element that is a file on the home screen of the other device, the contextual list of actions may include but are not limited to copying the file from the other device to the computer (152), getting information about the file, and searching for the file on the internet. As another example, if the selected element representation corresponds to an element that is an application link or executable, such as an online game, on the screen of the other device, the contextual list of actions may include but are not limited to downloading the application from an online store, initiating the application, and getting information about the application. As another example, if the selected element representation corresponds to an element that is a contact file, the list of contextual actions may include but are not limited to updating the computer (152) with the contact information included in the contact file and adding the contact file to a contact library of the computer (152). Readers of skill in the art will realize multi-device visual correlation interaction according to embodiments of the present invention is possible using different types of elements and actions not listed here.

Figure 3:
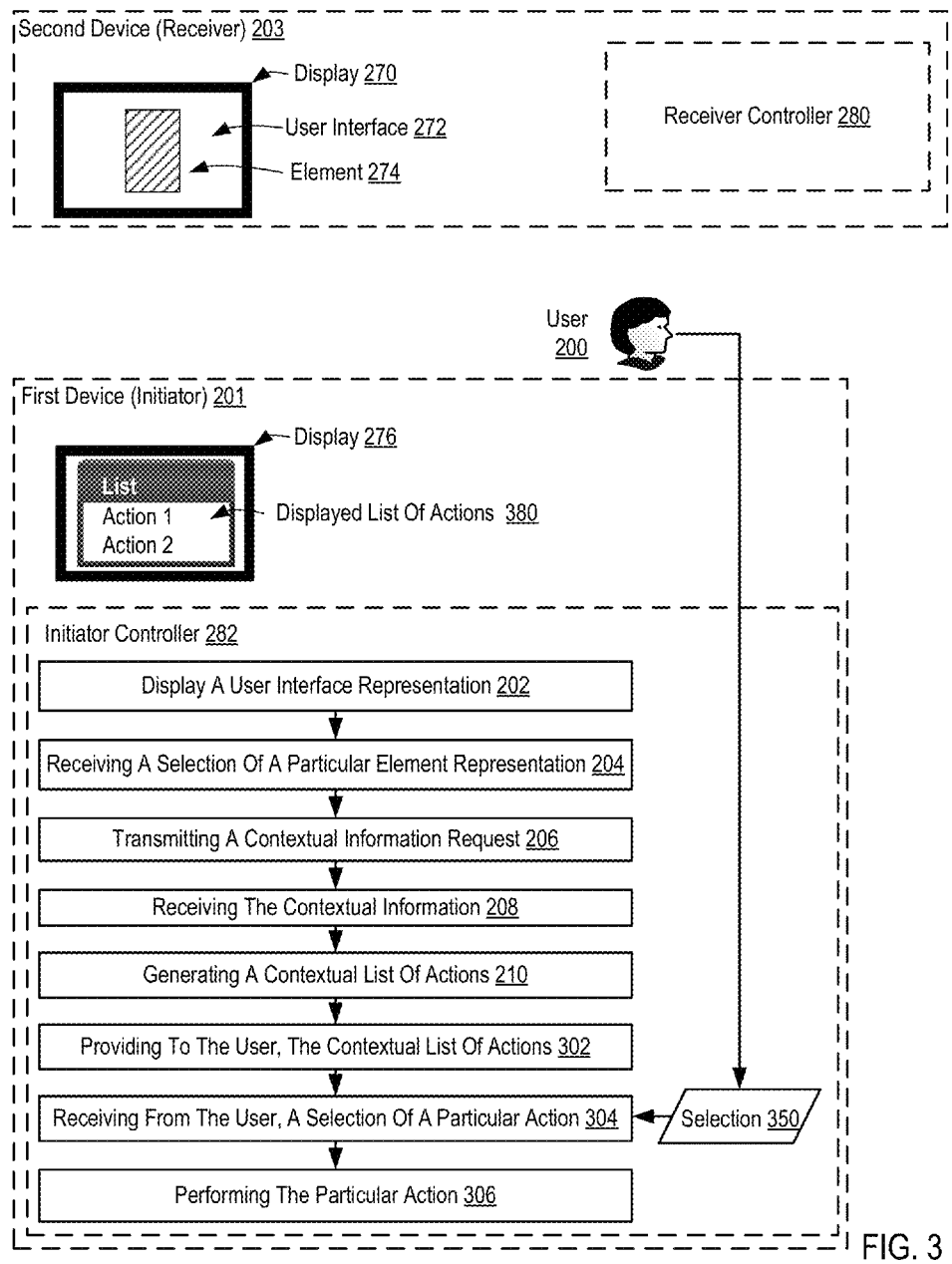
FIG. 3 sets forth a flow chart illustrating a further exemplary method for multi-device visual correlation interaction according to embodiments of the present invention.

For further explanation, FIG. 3 sets forth a flow chart illustrating a further exemplary method for multi-device visual correlation interaction according to embodiments of the present invention. The method of FIG. 3 is similar to the method of FIG. 2 in that the method of FIG. 3 also includes displaying (202), by a first device (201), a user interface representation (277) of a user interface (272) displayed by a second device (203); receiving (204) from a user (200) of the first device (201), a selection (250) of a particular element representation (278) of the user interface representation (277); transmitting (206) to the second device (203), by the first device (201), a contextual information request (252) corresponding to the selection (250); in response to transmitting the contextual information request (252), receiving (208) from the second device (203), by the first device (201), contextual information (256) corresponding to the selection (250); and generating (210) based on the contextual information (256), by the first device (201), a contextual list of actions (260) associated with the particular element (274).

The method of FIG. 3 includes providing (302) to the user (200), by the first device (201), the contextual list of actions (258). Providing (302) to the user (200), by the first device (201), the contextual list of actions (258) may be carried out by displaying on a display device of the first device, a representation of the contextual list of actions, such as a displayed list of actions (380) illustrated in FIG. 3. A user may select an action from the displayed list of actions.

The method of FIG. 3 includes receiving (304) from the user (200), by the first device (201), a selection (350) of a particular action from the contextual list of actions (258). Receiving (304) from the user (200), by the first device (201), a selection (350) of a particular action from the contextual list of actions (258) may be carried out by receiving user touch screen input, keyboard input, or any other type of user input that indicates a selection of one of the actions provided to the user in the list of actions.

The method of FIG. 3 includes performing (306), by the first device (201), the particular action. Performing (306), by the first device (201), the particular action may be carried out by executing one or more local actions and instructing one or more other devices to perform remote actions. Examples of local actions may include but are not limited to storing a received file at the first device, performing a search on the internet for information associated with a file, and presenting additional options or action lists to a user. Examples of remote actions may include but are not limited to adding a movie to an online movie queue associated with an account of the user and transferring data from a source to the first device.

Figure 4:
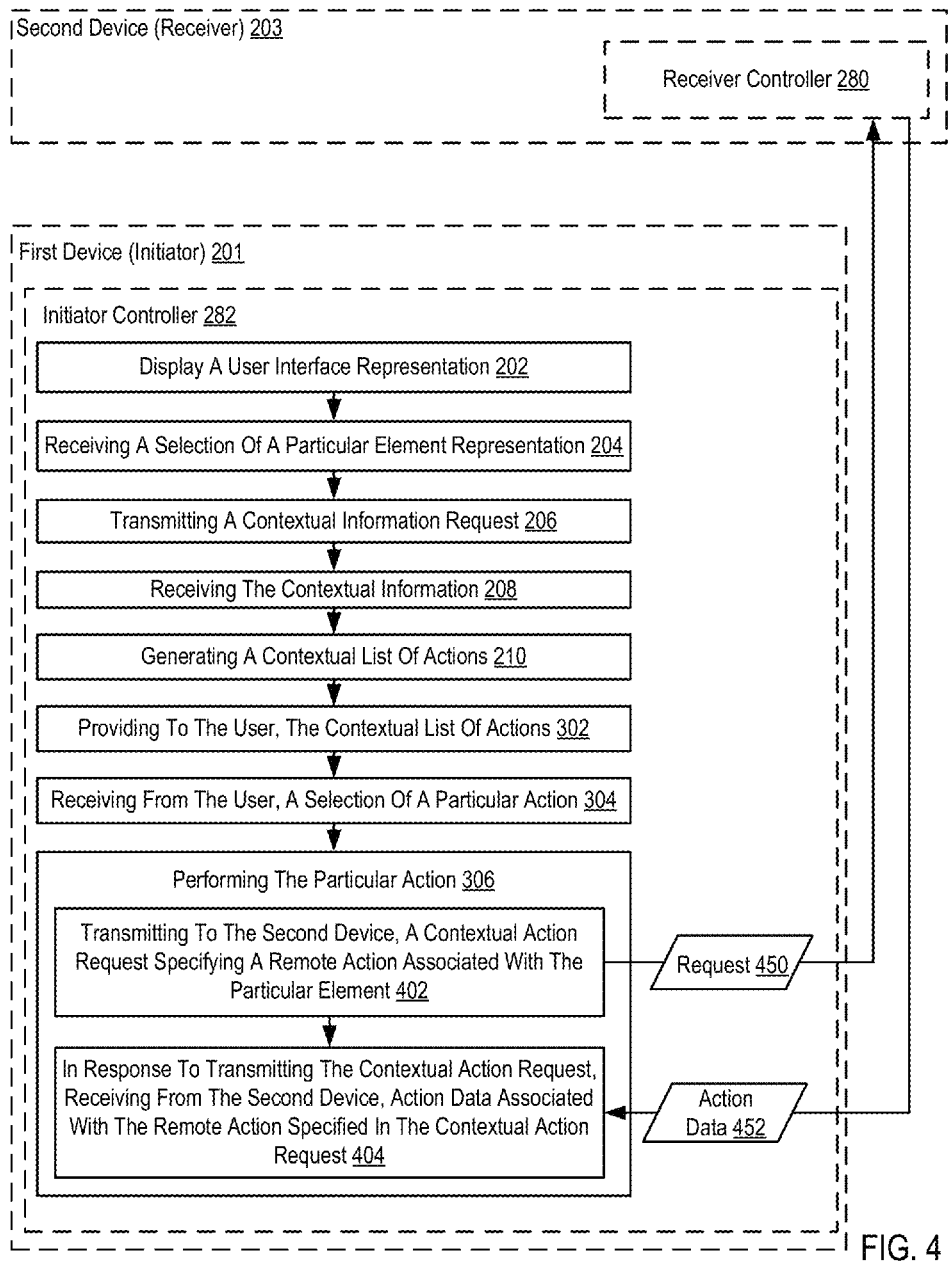
FIG. 4 sets forth a flow chart illustrating a further exemplary method for multi-device visual correlation interaction according to embodiments of the present invention.

For further explanation, FIG. 4 sets forth a flow chart illustrating a further exemplary method for multi-device visual correlation interaction according to embodiments of the present invention. The method of FIG. 4 is similar to the method of FIG. 3 in that the method of FIG. 4 also includes displaying (202), by a first device (201), a user interface representation (277) of a user interface (272) displayed by a second device (203); receiving (204) from a user (200) of the first device (201), a selection (250) of a particular element representation (278) of the user interface representation (277); transmitting (206) to the second device (203), by the first device (201), a contextual information request (252) corresponding to the selection (250); in response to transmitting the contextual information request (252), receiving (208) from the second device (203), by the first device (201), contextual information (256) corresponding to the selection (250); generating (210) based on the contextual information (256), by the first device (201), a contextual list of actions (260) associated with the particular element (274); providing (302) to the user (200), by the first device (201), the contextual list of actions (258); receiving (304) from the user (200), by the first device (201), a selection (350) of a particular action from the contextual list of actions (258); and performing (306), by the first device (201), the particular action.

In the method of FIG. 4, however, performing (306), by the first device (201), the particular action includes transmitting (402) to the second device (203), by the first device (201), a contextual action request (450) specifying a remote action (460) associated with the particular element (274). A remote action is an action that is performed by another device that is not the initiating device (i.e., the first device (201). Examples of remote actions may include but are not limited to adding a movie to an online movie queue associated with an account of the user and transferring data from a source to the first device. Transmitting (402) to the second device (203), by the first device (201), a contextual action request (450) specifying a remote action (460) associated with the particular element (274) may be carried out by indirect or direct communication with another device, such as the second device (203) or some type of third device, such as a content distribution server.

In the method of FIG. 4, performing (306), by the first device (201), the particular action also includes in response to transmitting the contextual action request (450), receiving (404) from the second device (203), by the first device (201), action data (452) associated with the remote action (460) specified in the contextual action request (450). Action data is data associated with performance of a remote action. Examples of action data include a confirmation indication that a remote action has been performed or the actual data generated by performance of the remote action, such as a data file containing a copy of a movie. Receiving (404) from the second device (203), by the first device (201), action data (452) associated with the remote action (460) specified in the contextual action request (450) may be carried out by receiving data messages from the second device (203).

Figure 5:
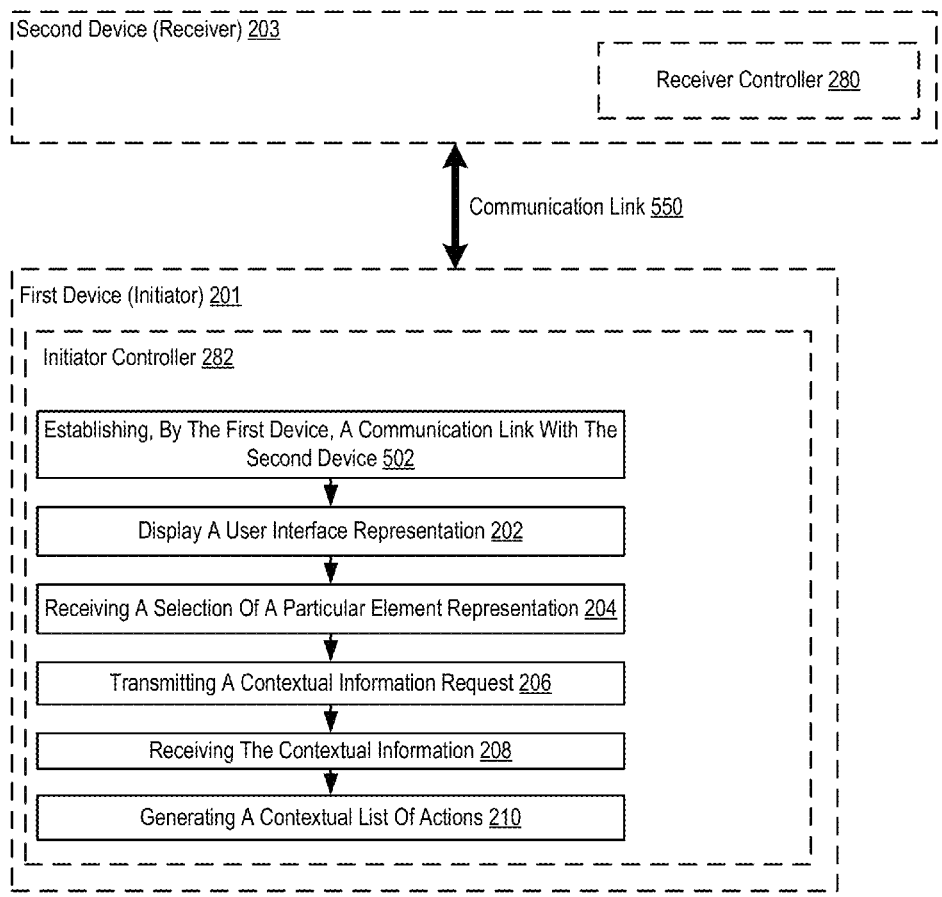
FIG. 5 sets forth a flow chart illustrating a further exemplary method for multi-device visual correlation interaction according to embodiments of the present invention.

For further explanation, FIG. 5 sets forth a flow chart illustrating a further exemplary method for multi-device visual correlation interaction according to embodiments of the present invention. The method of FIG. 3 is similar to the method of FIG. 2 in that the method of FIG. 3 also includes displaying (202), by a first device (201), a user interface representation (277) of a user interface (272) displayed by a second device (203); receiving (204) from a user (200) of the first device (201), a selection (250) of a particular element representation (278) of the user interface representation (277); transmitting (206) to the second device (203), by the first device (201), a contextual information request (252) corresponding to the selection (250); in response to transmitting the contextual information request (252), receiving (208) from the second device (203), by the first device (201), contextual information (256) corresponding to the selection (250); and generating (210) based on the contextual information (256), by the first device (201), a contextual list of actions (260) associated with the particular element (274).

The method of FIG. 5 also includes establishing (502), by the first device (201), a communication link (550) with the second device (203). Examples of communication links may include but are not limited to a wireless connection, such as a Bluetooth connection or WiFi connection, or a wired connection. Establishing (502), by the first device (201), a communication link (550) with the second device (203) may be carried out by activating a communication link between the first device (201) and the second device (203); sending one or more connection establishment requests; transmitting, receiving, and authenticating device identifications; presenting a connection request to a user, receiving user approval for a connection. For example, in the Bluetooth protocol, any device may perform an inquiry to find other devices to connect to, and any device can be configured to respond to such inquiries. However, if the device trying to connect knows the address of the device, the device may always respond to direct connection requests and transmits information if requested. Use of a device's services may require pairing or acceptance by its owner, but the connection itself may be initiated by any device and held until it goes out of range. Some devices can be connected to only one device at a time, and connecting to them prevents them from connecting to other devices and appearing in inquiries until they disconnect from the other device.

Figure 6:
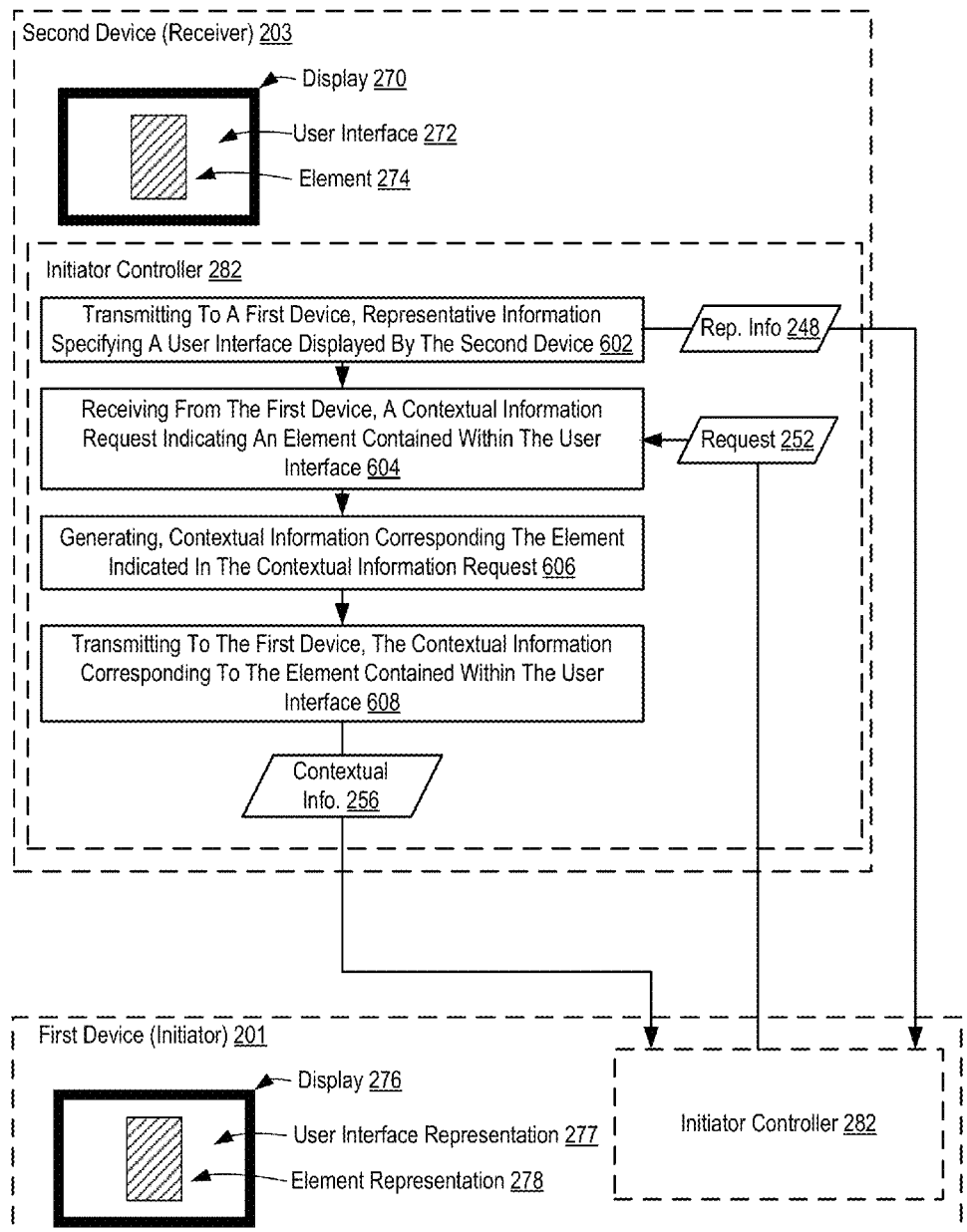
FIG. 6 sets forth a flow chart illustrating a further exemplary method for multi-device visual correlation interaction according to embodiments of the present invention.

For further explanation, FIG. 6 sets forth a flow chart illustrating a further exemplary method for multi-device visual correlation interaction according to embodiments of the present invention. The method of FIG. 6 is similar to the method of FIG. 2 in that the method of FIG. 6 includes a contextual information request (252); contextual information (256); a display (270) of the second device (203) containing a user interface (272) and an element (274); a display (276) of the first device (201) containing a user interface representation (277) containing a user interface representation (277) and an element representation (278).

The method of FIG. 6 also includes transmitting (602) to a first device (201), by a second device (203), representative information (248) specifying a user interface (272) displayed by the second device (203). Representative information is information associated with the rendering of an image of the user interface displayed by the second device (203). A user interface is an environment providing interaction between a user of a device and the software and hardware of the device. An element is an actionable object contained with the user interface. Examples of user interfaces may include but are not limited to desktops and windows of operating systems, as well as other environments capable of containing elements. Examples of elements may include but are not limited to data files, such as text files, images, and video clips. Elements may also include executable files, such as applications. A user interface representation is a copy of an image of a user interface displayed on another device and may include element representations. An element representation is a copy of an element contained within the user interface displayed on the other device. Transmitting (602) to a first device (201), by a second device (203), representative information (248) specifying a user interface (272) displayed by the second device (203) may be carried out by capturing an image displayed on the screen of the second device; generating representative information corresponding to the captured image; and delivering the representative information using indirect or direct communication between the first device (201) and the second device (203).

The method of FIG. 6 also includes receiving (604) from the first device (201), by the second device (203), a contextual information request (252) indicating an element (274) contained within the user interface (272) displayed by the second device (203). A contextual information request is a request for contextual information associated with an element represented by the selected element representation. Contextual information is information associated with the actionable properties of the element. For example, if a user selects an element representation of a text file, contextual information may indicate the types of actions capable of being performed on a text file, such as copying from one or more sources.

Receiving (604) from the first device (201), by the second device (203), a contextual information request (252) may be carried out by direct or indirect communication between the first device and the second device.

The method of FIG. 6 also includes in response to receiving the contextual information request (252), generating (606), by the second device (203), contextual information (256) corresponding the element (274) indicated in the contextual information request (252). Generating (606), by the second device (203), contextual information (256) corresponding the element (274) indicated in the contextual information request (252) may be carried out by identifying a type of the element, determining types of action capable of being performed on the type of element, and storing data indicating the determined type of actions as contextual information.

The method of FIG. 6 also includes transmitting (608) to the first device (201), by the second device (203), the contextual information (256) corresponding to the element (274) contained within the user interface (272). Transmitting (608) to the first device (201), by the second device (203), the contextual information (256) corresponding to the element (274) contained within the user interface (272) may be carried out by direct or indirect communication between the first device (201) and the second device (203).

Figure 7:
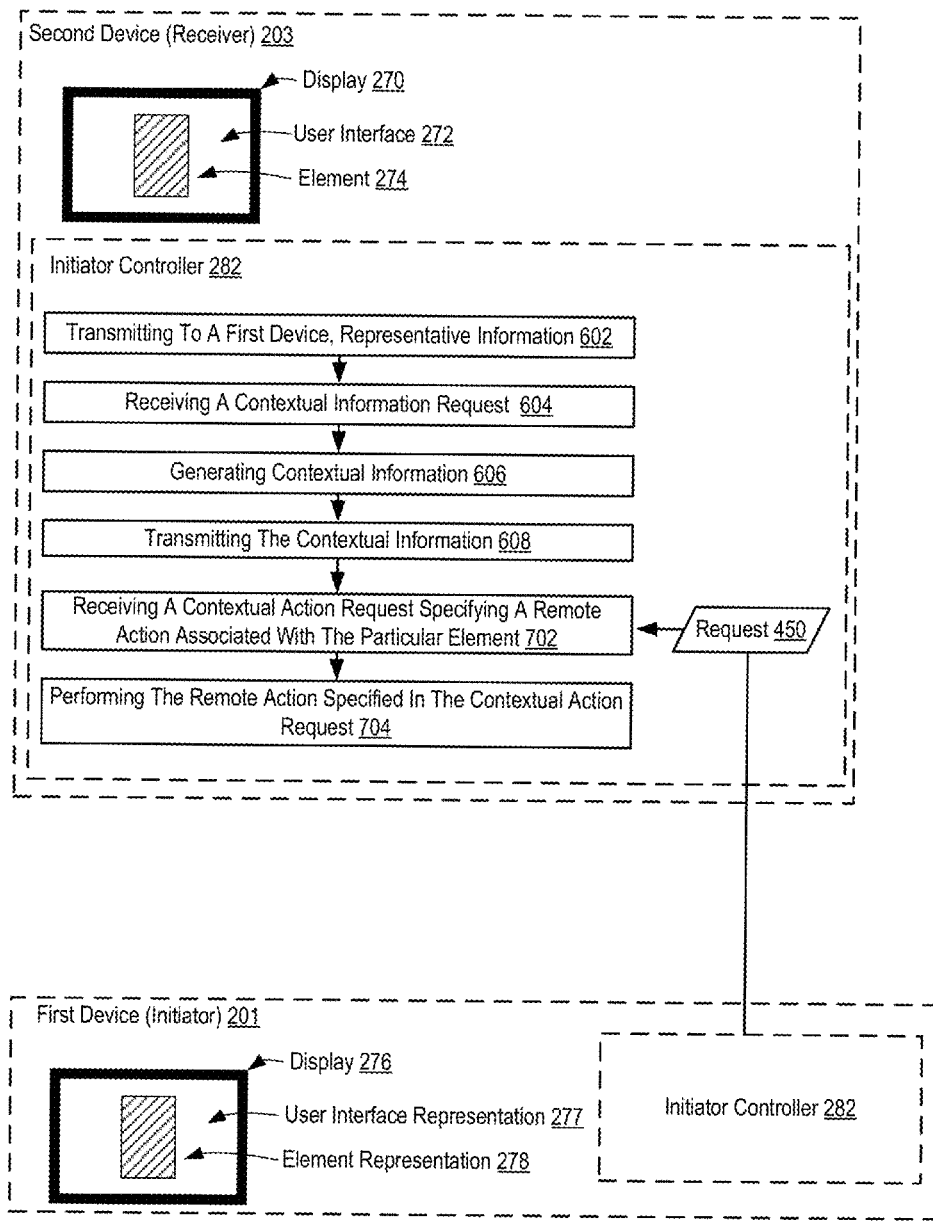
FIG. 7 sets forth a flow chart illustrating a further exemplary method for multi-device visual correlation interaction according to embodiments of the present invention.

For further explanation, FIG. 7 sets forth a flow chart illustrating a further exemplary method for multi-device visual correlation interaction according to embodiments of the present invention. The method of FIG. 7 is similar to the method of FIG. 6 in that the method of FIG. 7 includes transmitting (602) to a first device (201), by a second device (203), representative information (248) specifying a user interface (272) displayed by the second device (203); receiving (604) from the first device (201), by the second device (203), a contextual information request (252) indicating an element (274) contained within the user interface (272) displayed by the second device (203); in response to receiving the contextual information request (252), generating (606), by the second device (203), contextual information (256) corresponding the element (274) indicated in the contextual information request (252); transmitting (608) to the first device (201), by the second device (203), the contextual information (256) corresponding to the element (274) contained within the user interface (272).

The method of FIG. 7 includes receiving (702) from the first device (201), by the second device (203), a contextual action request (450) specifying a remote action (460) associated with the particular element (274). A remote action is an action that is performed by another device that is not the initiating device (i.e., the first device (201). Examples of remote actions may include but are not limited to adding a movie to an online movie queue associated with an account of the user and transferring data from a source to the first device. Receiving (702) from the first device (201), by the second device (203), a contextual action request (450) may be carried out by requesting data including an instruction to perform a remote action.

The method of FIG. 7 also includes in response to receiving the contextual action request (450), performing the remote action (460) specified in the contextual action request (450). Performing the remote action (460) specified in the contextual action request (450) may be carried out by processing and transmitting data associated with the element; storing data associated with the element; sending a confirmation message to the first device or another device; sending an instruction to perform an another action to another device; presenting one or more options or status message to a user of the second device; and receiving user approval to perform one or more actions, such as the remote action.

Exemplary embodiments of the present invention are described largely in the context of a fully functional computer system for multi-device visual correlation interaction. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause a first device of the apparatus to carry out the steps of:
    displaying a representation of a user interface displayed by a second device such representation based on images of the user interface displayed by the second device which are captured by a camera of the first device, the representation containing one or more element representations, each element representation corresponding to an element contained within the user interface displayed by the second device;
    receiving from a user of the first device, a selection of a particular element representation of the representation, the particular element representation corresponding to a particular element contained within the user interface;
    transmitting to the second device, a contextual information request corresponding to the selection;
    in response to transmitting the contextual information request, receiving from the second device, contextual information corresponding to the selection; and
    generating based on the contextual information, a contextual list of actions associated with the particular element.

2. The apparatus of claim 1 further comprising computer program instructions that, when executed by the computer processor, cause the first device to carry out the steps of:
    providing to the user, the contextual list of actions;
    receiving from the user, a selection of a particular action from the contextual list of actions; and
    performing the particular action.

3. The apparatus of claim 2 wherein performing the particular action includes:
    transmitting to the second device, a contextual action request, the contextual action request specifying a remote action associated with the particular element; and
    in response to transmitting the contextual action request, receiving from the second device, action data associated with the remote action specified in the contextual action request.

4. The apparatus of claim 1 further comprising computer program instructions that, when executed by the computer processor, cause the first device to carry out the step of establishing a communication link with the second device.

5. The apparatus of claim 1 wherein the contextual information request includes positional information of the particular element representation within the representation.

6. A computer program product for multi-device visual correlation interaction, the computer program product including a computer readable storage medium, wherein the computer readable storage medium is not a signal, the computer program product comprising computer program instructions that, when executed, cause a first device to carry out the steps of:
    displaying a representation of a user interface displayed by a second device such representation based on images of the user interface displayed by the second device which are captured by a camera of the first device, the representation containing one or more element representations, each element representation corresponding to an element contained within the user interface displayed by the second device;
    receiving from a user of the first device, a selection of a particular element representation of the representation, the particular element representation corresponding to a particular element contained within the user interface;
    transmitting to the second device, a contextual information request corresponding to the selection;
    in response to transmitting the contextual information request, receiving from the second device, contextual information corresponding to the selection; and
    generating based on the contextual information, a contextual list of actions associated with the particular element.

7. The computer program product of claim 6 further comprising computer program instructions that, when executed, cause the first device to carry out the steps of:
    providing to the user the contextual list of actions;
    receiving from the user, a selection of a particular action from the contextual list of actions; and
    performing the particular action.

8. The computer program product of claim 7 wherein performing, by the first device, the particular action includes:
    transmitting to the second device, a contextual action request, the contextual action request specifying a remote action associated with the particular element; and
    in response to transmitting the contextual action request, receiving from the second device, action data associated with the remote action specified in the contextual action request.

9. The computer program product of claim 6 further comprising computer program instructions that, when executed, cause the first device to carry out the step of establishing, by the first device, a communication link with the second device.

10. The computer program product of claim 6 wherein the contextual information request includes positional information of the particular element representation within the representation.

* * * * *